US010503486B2

(12) United States Patent
Dimitrov et al.

(10) Patent No.: US 10,503,486 B2
(45) Date of Patent: Dec. 10, 2019

(54) METHODS AND APPARATUS TO REDUCE APPLICATION DEPLOYMENTS SIZES

(71) Applicant: VMware, Inc., Palo Alto, CA (US)

(72) Inventors: George Dimitrov, Sofia (BG);
Alexander Stoyanov, Sofia (BG);
Miroslav Mitevski, Sofia (BG);
Rostislav Georgiev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 43 days.

(21) Appl. No.: 15/374,743

(22) Filed: Dec. 9, 2016

(65) Prior Publication Data

US 2018/0165080 A1 Jun. 14, 2018

(51) Int. Cl.
*G06F 8/60* (2018.01)
*G06F 8/54* (2018.01)
*G06F 9/445* (2018.01)

(52) U.S. Cl.
CPC . *G06F 8/60* (2013.01); *G06F 8/54* (2013.01)

(58) Field of Classification Search
CPC .................................... G06F 8/54; G06F 8/60
USPC .................................................. 717/164, 175
See application file for complete search history.

(56) References Cited

U.S. PATENT DOCUMENTS

| | | | | |
|---|---|---|---|---|
| 5,956,513 A * | 9/1999 | McLain, Jr. | ............... | G06F 8/71 717/142 |
| 6,367,075 B1 * | 4/2002 | Kruger | ..................... | G06F 8/62 717/169 |
| 6,854,111 B1 * | 2/2005 | Havner | ............... | G05B 19/0426 700/17 |
| 7,080,370 B1 * | 7/2006 | Crowl | ..................... | G06F 8/41 717/163 |
| 7,290,252 B2 * | 10/2007 | Diedrich | ................... | G06F 8/54 717/145 |
| 7,549,148 B2 * | 6/2009 | Cross | ..................... | G06F 8/658 717/174 |
| 2005/0216912 A1 * | 9/2005 | Cox | ......................... | G06F 8/71 717/178 |
| 2006/0161892 A1 * | 7/2006 | Anand | ..................... | G06F 8/71 717/120 |

(Continued)

OTHER PUBLICATIONS

NN9603333, "Build Created C++ Template Instantiations"; IBM Technical Disclosure Bulletin, Mar. 1996. (Year: 1996).*

*Primary Examiner* — Ryan D. Coyer
(74) *Attorney, Agent, or Firm* — Thomas Horstemeyer, LLP (57) ABSTRACT

Methods and apparatus to reduce application deployment sizes are disclosed. An example apparatus includes a build generator to generate a build profile associated with a virtual appliance in a virtualization environment, the build profile including a plurality of application components including archive files associated with the virtual appliance. The example apparatus also includes a duplicate identifier to determine when a first library and a second library included in the build profile are duplicate libraries, the first library associated with a first filename and a first data portion and the second library associated with a second filename and a second data portion. The example apparatus also includes a duplicate remover to, in response to a determination that the first library and the second library are duplicate libraries, replace the first filename with a hard link to the second data portion to update the build profile.

20 Claims, 5 Drawing Sheets

(56) References Cited

U.S. PATENT DOCUMENTS

| | | | | |
|---|---|---|---|---|
| 2011/0246830 A1* | 10/2011 | Chowdhury | ............. | G06F 8/40 |
| | | | | 714/35 |
| 2012/0051668 A1* | 3/2012 | Martin | ................. | G11B 27/022 |
| | | | | 382/305 |
| 2012/0254131 A1* | 10/2012 | Al Kiswany | ......... | G06F 16/188 |
| | | | | 707/692 |
| 2012/0317561 A1* | 12/2012 | Aslam | ................. | G06F 9/45529 |
| | | | | 717/168 |
| 2013/0276056 A1* | 10/2013 | Epstein | ................ | G06F 21/604 |
| | | | | 726/1 |
| 2014/0129005 A1* | 5/2014 | Weatherhead | ...... | G06F 21/6218 |
| | | | | 700/86 |
| 2014/0372998 A1* | 12/2014 | Salameh | .................. | G06F 8/65 |
| | | | | 717/169 |

\* cited by examiner

METHODS AND APPARATUS TO REDUCE APPLICATION DEPLOYMENTS SIZES

FIELD OF THE DISCLOSURE

The present disclosure relates generally to computing environments and, more particularly, to methods and apparatus to methods and apparatus to reduce application deployment sizes.

BACKGROUND

Virtualizing computer systems provide benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provisioner as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

DETAILED DESCRIPTION

Example methods, systems and apparatus to reduce application deployment sizes are disclosed herein. An example apparatus includes a build generator to generate a build profile associated with a virtual appliance in a virtualization environment, the build profile including a plurality of application components including archive files associated with the virtual appliance. The example apparatus also includes a duplicate identifier to determine when a first library and a second library included in the build profile are duplicate libraries, the first library associated with a first filename and a first data portion and the second library associated with a second filename and a second data portion. The example apparatus also includes a duplicate remover to, in response to a determination that the first library and the second library are duplicate libraries, replace the first filename with a hard link to the second data portion to update the build profile.

In some examples, the duplicate identifier determines whether the first library and the second library are duplicate libraries by comparing a first file size associated with the first library and a second file size associated with the second library.

In some examples, the duplicate identifier generates a first checksum value associated with the first library and generates a second checksum value associated with the second library when the first file size and the second file size are non-unique values. The example duplicate identifier also compares the first checksum value with the second checksum value to determine whether the first library and second library are duplicate libraries.

In some examples, the duplicate identifier determines whether the first library and the second library are duplicate libraries by comparing a first checksum value associated with the first library and a second checksum value associated with the second library.

In some examples, the duplicate remover removes the first data portion from the build profile.

In some examples, the apparatus also includes a package builder to generate a distribution package based on the updated build profile.

In some examples, the distribution package is an open virtualization format archive file when the build profile is associated with a new install of the virtual appliance. In some examples, the distribution package is a Red Hat package manager file when the build profile is associated with an update of the virtual appliance.

An example computer readable storage medium includes instructions that, when executed, cause a machine to implement at least a build generator to generate a build profile associated with a virtual appliance in a virtualization environment. In the example storage medium, the build profile includes a plurality of application components including archive files associated with the virtual appliance. The example storage medium also includes instructions that, when executed, cause the machine to implement a duplicate identifier to determine when a first library and a second library included in the build profile are duplicate libraries. In the example storage medium, the first library is associated with a first filename and a first data portion and the second library is associated with a second filename and a second data portion. The example storage medium also includes instructions that, when executed, cause the machine to implement a duplicate remover to, in response to a determination that the first library and the second library are duplicate libraries, replace the first filename with a hard link to the second data portion to update the build profile.

In some examples, the instructions, when executed, cause the duplicate identifier to determine whether the first library and the second library are duplicate libraries by comparing a first file size associated with the first library and a second file size associated with the second library.

In some examples, the instructions, when executed, cause the duplicate identifier to generate a first checksum value associated with the first library and generate a second checksum value associated with the second library when the first file size and the second file size are non-unique values, and to compare the first checksum value with the second checksum value to determine whether the first library and second library are duplicate libraries.

In some examples, the instructions, when executed, cause the duplicate identifier to determine whether the first library and the second library are duplicate libraries by comparing a first checksum value associated with the first library and a second checksum value associated with the second library.

In some examples, the instructions, when executed, cause the duplicate remover to remove the first data portion from the build profile.

In some examples, the instructions, when executed, further cause the machine to implement a package builder to generate a distribution package based on the updated build profile.

An example method includes generating, by executing an instruction with at least one processor, a build profile associated with a virtual appliance in a virtualization environment, the build profile including a plurality of application components including archive files associated with the virtual appliance. The example method also includes determining, by executing an instruction with the at least one processor, when a first library and a second library included in the build profile are duplicate libraries, the first library associated with a first filename and a first data portion and the second library associated with a second filename and a second data portion. The example method also includes in response to determining that the first library and the second library are duplicate libraries, replacing, by executing an instruction with the at least one processor, the first filename with a hard link to the second data portion to update the build profile.

In some examples, determining when the first library and the second library are duplicate libraries includes comparing a first file size associated with the first library and a second file size associated with the second library.

In some examples, the method further includes generating a first checksum value associated with the first library and generating a second checksum value associated with the second library when the first file size and the second file size are non-unique values, and comparing the first checksum value with the second checksum value to determine whether the first library and second library are duplicate libraries.

In some examples, determining when the first library and the second library are duplicate libraries includes comparing a first checksum value associated with the first library and a second checksum value associated with the second library.

In some examples, the method further includes removing the first data portion from the build profile.

In some examples, the method further includes extracting the archive files included in the build profile.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012. U.S. patent application Ser. No. 11/903,374, U.S. Provisional Patent Application No. 60/919,965, and U.S. Provisional Patent Application No. 61/736,422 are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of a process is known as a container. Several containers may share a host operating system. Thus, a process executing within a container is isolated from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Figure 1:
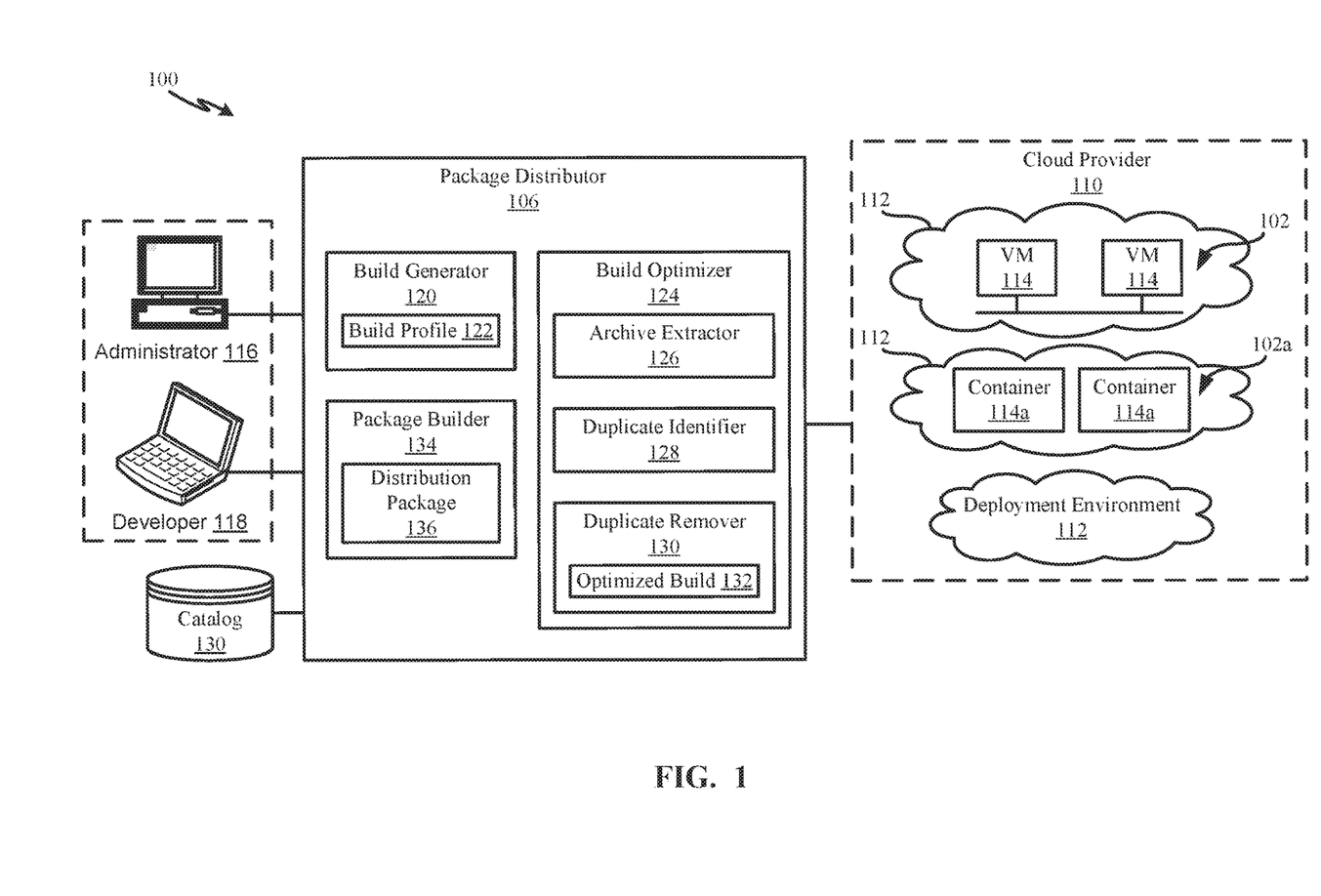
FIG. 1 depicts an example system constructed in accordance with the teachings of this disclosure for reducing application deployment sizes.

FIG. 1 depicts an example system 100 constructed in accordance with the teachings of this disclosure for reducing application deployment sizes. The example system 100 includes a package distributor 106 as described in more detail below. As described herein, the example system 100 facilitates building a distribution package 136 (e.g., a virtual appliance) for deployment in a virtualization environment such as an example cloud computing platform provider 110. In the illustrated example, the distribution package 136 can be deployed as an automation tool, for example, used to deliver VMs and associated applications for on-premise automation and/or handling of external cloud resources (e.g., Microsoft Azure™, Amazon Web Services™, etc.). In the illustrated example, the distribution package 136 is a multi-tier application created by developer 118 for deployment (e.g., for an enterprise) in a deployment environment 112 provided by a cloud computing platform provider 110 (sometimes referred to as a "cloud provider"). The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, devices, etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging and/or production of applications. The administrator 116, the developer 118, other programs and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example package distributor 106 of FIG. 1, which may be running in one or more VMs, facilitates building distribution packages 136 and distributing the distribution packages 136 onto one of the example deployment environments 112. As illustrated in FIG. 1, the example package distributor 106 includes a build generator 120, a build optimizer 124, and a package builder 134. The example build optimizer 124 of FIG. 1 includes an archive extractor 126, a duplicate identifier 128 and a duplicate remover 130.

The example build generator 120 generates a build profile 122 that specifies a logical topology of an application to be deployed. The example build profile 122 generally captures the structure of an application 102 as a collection of application components executing on virtual computing resources. For example, the build profile 122 (sometimes referred to as a "blueprint") generated by the example build generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components. In the illustrated example, the application is distributed and/or deployed to the one or more deployment environments 112 as the distribution package 136.

The example build profile 122 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties and/or other details about items in the catalog 130. Based on the application, the example build profile 122 may define one or more dependencies between application components to indicate an installation order of the application components during deployment. For example, since a load balancer usually cannot be configured until a web application is up and running, the developer 118 may specify a dependency from an Apache service to an application code package.

When generating the distribution package 136, the developer 118 develops the build profile 122 which includes the application components included in the distribution package 136. For example, the package distributor 106 may provide a user interface for a user of the build generator 120 (e.g., the administrator 116, the developer 118, etc.) to specify application components to be assigned to an instance of a build profile 122. The developer 118 specifies the one or more application components such as services and code components, which may be installed on a computing resource for supporting execution of an application. Code components are application-specific binaries, scripts, or processes, for example, written by the developer 118 and packaged into one or more files, to provide logic for the application. In the example catalog 130, the code components are represented as types or formats of scripting and application code. Examples of types of code components include Java Archive (JAR) files, Java Enterprise Archive (EAR) files, Java web application archives (WAR) files, Ruby Gems packages, SQL scripts, and other suitable modules for scripting logic.

Services are scripted software that provide a software infrastructure for an application and are generally reused in multiple applications. Examples of services include application servers (e.g., Rails, Apache Tomcat, Jboss, etc.), database servers (e.g., GemFire, MySQL, SQLFire, MongoDB, Postgress, etc.), monitoring services (e.g., Hyperic, SpringInsight, etc.), web servers (e.g., Apache, VMware vFabric Enterprise Ready Server, etc.), messaging services (e.g., RabbitMQ, etc.), and additional or alternative middleware services.

In some examples, the developer 118 may also include details and credentials for the distribution package 136. For example, the developer 118 may provide information such as an Internet Protocol (IP) address or hostname at which the cloud provider 110 is accessible, credentials (e.g., a username and password) for an account authorized to make installation requests of the distribution package 136, etc.

Figure 2:
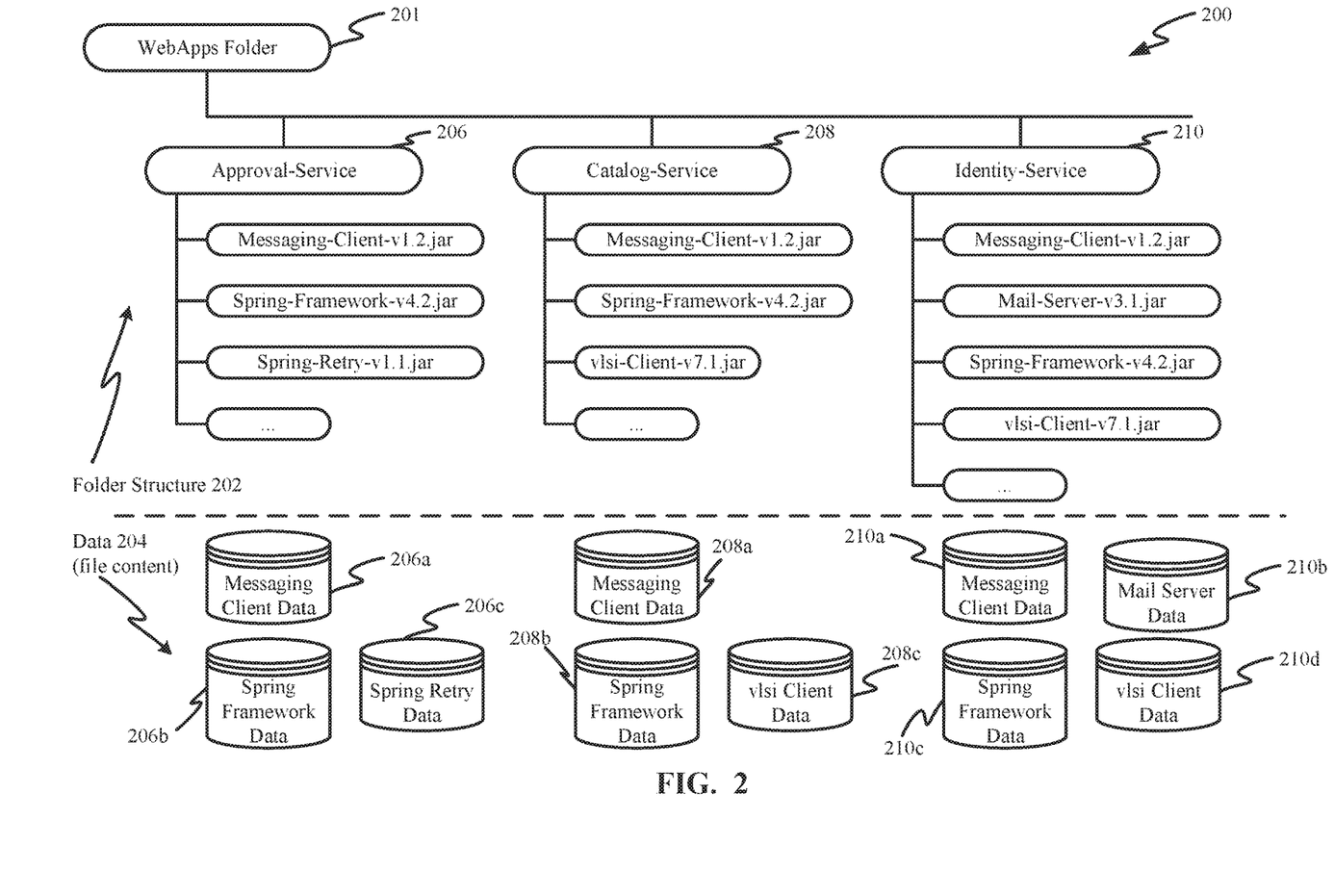
FIG. 2 illustrates a portion of an example build profile generated by the example package distributor of FIG. 1.

FIG. 2 illustrates a portion 200 of an example implementation of the build profile 122 in the illustrated example of FIG. 2, the build profile 122 includes a folder structure portion 202 and a data portion 204 of a Web applications (webapps) folder 201. The example webapps folder 201 of FIG. 2 includes an approval service WAR file 206 ("approval-service"), a catalog service WAR file 208 ("catalog-service") and an identity service WAR file 210 ("identity-service"). Catalog services provide a user interface via which a user can request provisioning of different preset environments (e.g., a VM including an operating system and software and some customization, etc.), for example. Identity services facilitate authentication and authorization of users and assigned roles, for example.

Each of the WAR files 206, 208, 210 of the illustrated example of FIG. 2 include corresponding libraries (e.g., JAR files) that facilitate the respective web application. The folder structure portion 202 of the webapps folder 201 includes the filenames of the respective libraries, and the data portion 204 includes the data of the respective libraries. For example, the approval service WAR file 206 includes a "Messaging-Client-v1.2.jar" file, which corresponds to "Messaging Client Data" library 206a, a "Spring-Framework-v4.2.jar" file, which corresponds to "Spring Framework Data" library 206b and a "Spring-Retry-v1.1.jar" file, which corresponds to "Spring Retry Data" library 206c. The example catalog service WAR file 208 includes a "Messaging-Client-v1.2.jar" file, which corresponds to "Messaging Client Data" library 208a, a "Spring-Framework-v4.2.jar" file, which corresponds to "Spring Framework Data" library 208b and a "vlsi-Client-v7.1.jar" file, which corresponds to "vlsi Client Data" library 208c. The example identity service WAR file 210 includes a "Messaging-Client-v1.2.jar" file, which corresponds to "Messaging Client Data" library 210a, a "Mail-Server-v3.1.jar" file, which corresponds to "Mail Server Data" library 210b, a "Spring-Framework-v4.2.jar" file, which corresponds to "Spring Framework Data" library 210c and a "vlsi-Client-v7.1.jar" file, which corresponds to "vlsi Client Data" library 210d. In the illustrated example of FIG. 2, the filename included in the folder structure portion 202 is a link to the corresponding library in the data portion 204. For example, the "Messaging-Client-v1.2.jar" included in the folder structure portion 202 of the approval service 206 is a link to the "Messaging Client Data" library 206a included in the data portion 204. In the illustrated example of FIG. 2, the libraries are in the JAR format. However, other file formats may additionally or alternatively be used.

As described above, in some instances, services and other application-specific code components (e.g., libraries such as JAR files, etc.) may be reused within a build profile 122. To reduce the size of the distribution package 136, the example package distributor 106 includes the build optimizer 124.

The example build optimizer 124 reduces the size of the distribution package 136 by, for example, reducing the number of duplicate libraries included in the distribution package 136. Furthermore, the example build optimizer 124 reduces the size of distribution packages while maintaining the folder structure of the application. The example build optimizer 124 of FIG. 1 includes an archive extractor 126, an example duplicate identifier 128 and an example duplicate remover 130.

In the illustrated example of FIG. 1, the build optimizer 124 includes the example archive extractor 126 to identify archives (e.g., web application archive (WAR) files) included in the build profile 122 and to extract code components (e.g., Java Archive (JAR) files) from the identified web archive. For example, referring to the example webapps folder 201 of FIG. 2, the archive extractor 126 may parse the webapps folder 201 to extract and identify the application components included in the webapps folder 201 (e.g., the approval service WAR file 206, the catalog service WAR file 208 and the identity service WAR tile 210). In the illustrated example, the archive extractor 126 utilizes an archive program, such as, for example, ZIP, TAR, etc., to extract the application components. The example archive extractor 126 of FIG. 1 also identities the libraries associated with the respective components (e.g., the "Messaging-Client-v1.2.jar" library 206*a*, the "Spring-Framework-v4.2.jar" library 206*b* and the "Spring-Retry-v1.1.jar" library 206*c* of the approval service WAR file 206, etc.).

In the illustrated example of FIG. 1, the package optimizer 124 includes the example duplicate identifier 128 to identify duplicate libraries in the extracted archive. For example, the duplicate identifier 128 may determine that the "Messaging-Client-v1.2.jar" libraries 206*a*, 208*a*, 210*a* of the corresponding application components 206, 208, 210 are duplicate libraries. In the illustrated example, duplicate libraries may be included in the build profile 122 due to dependencies common to different application components in the build profile 122. For example, the approval service WAR file 206, the catalog service WAR file 208 and the identity service WAR file 210 each include the "Messaging-Client-v1.2.jar" libraries 206*a*, 208*a*, 210*a*, respectively, to, for example, facilitate communications between the respective services 206, 208, 210. In the illustrated example of FIG. 1, the duplicate identifier 128 identifies the one or more duplicate libraries based on checksum comparisons. For example, the duplicate identifier 128 may calculate a checksum value for each library included in the example webapps folder 201. Example checksum algorithms that may be implemented by the duplicate identifier 128 include, for example, secure hash algorithm 1 (SHA1), SHA2, MD5, parity checks, modular sums, cyclic redundant checks, etc. However, other techniques for generating checksum values of the respective libraries may additionally or alternatively be used. The example duplicate identifier 128 identifies the duplicate libraries when the checksum of two libraries is the same. However, other techniques for identifying duplicate libraries may additionally or alternatively be used. For example, the duplicate identifier 128 may compare sizes of the libraries, filenames (e.g., "Messaging-Client-v1.2.jar," etc.), the file contents of the archives, etc.

In some examples, the duplicate identifier 128 determines whether libraries are duplicate libraries in a multi-stage operation. For example, the duplicate identifier 128 may first compare file sizes of the libraries to identify libraries with unique file sizes. In the illustrated example, libraries with unique file sizes are not duplicate libraries and, thus, cannot be removed from the build profile 122. In some examples, if the duplicate identifier 128 identifies two libraries with the same file size, the duplicate identifier 128 may then generate checksum values of the identified libraries to determine if they are duplicate libraries. By performing a multi-stage test to determine if the libraries are duplicate libraries (e.g., by first checking file sizes and then generating checksum values for libraries as needed), the example duplicate identifier 128 reduces the amount of processing resources and time consumed) in determining checksum values.

Referring to the example portion 200 of the build profile 122 of FIG. 2, the example duplicate identifier 128 may generate checksums of the libraries included in the data portion 204 and determine which libraries are duplicate libraries. For example, the duplicate identifier 128 may determine that the "Messaging Client Data" libraries 206*a*, 208*a*, 210*a* linked to by the "Messaging-Client-v1.2.jar" files in the approval service WAR file 206, the catalog service WAR file 208 and the identity service WAR file 210 are duplicate libraries (e.g., the information included in the respective libraries is the same) based on the respective libraries having the same checksum values. The example duplicate identifier 128 may also determine that the "Spring Framework Data" libraries 206*b*, 208*b*, 210*c* are duplicate libraries based on their checksum value. The example duplicate identifier 128 may also determine that the "vlsi Client Data" libraries 208*c*, 210*d* linked to by the "vlsi-Client-v7.1.jar" files in the catalog services WAR file 208 and the identity service WAR file 210 are duplicate libraries based on the respective library checksum values.

In the illustrated example of FIG. 1, the build optimizer 124 includes the example duplicate remover 128 to generate an example optimized build 132 by reducing the number of duplicate libraries included in the build profile 122. For example, the example duplicate remover 128 of FIG. 1 replaces the "Messaging-Client-v1.2.jar" file in the approval service 206 with a link to the example messaging client data 208*a* of the catalog service 208. In the illustrated example, the duplicate remover 130 uses a "hard link" to replace the file instead of a "symbolic link." A hard link, as used herein, is a direct pointer to the original file content (e.g., the messaging client data 208*a*). In contrast, a "symbolic link" (also referred to as a "soft link" or a "symlink") is a file that includes information to point to another file. For example, in the above example, replacing the "Messaging-Client-v1.2.jar" file in the approval service 206 with a symbolic link may include replacing the file with a link to the "Messaging-Client-v1.2.jar" file in the catalog service 208, which then points to the messaging client 208*a*.

Figure 3:
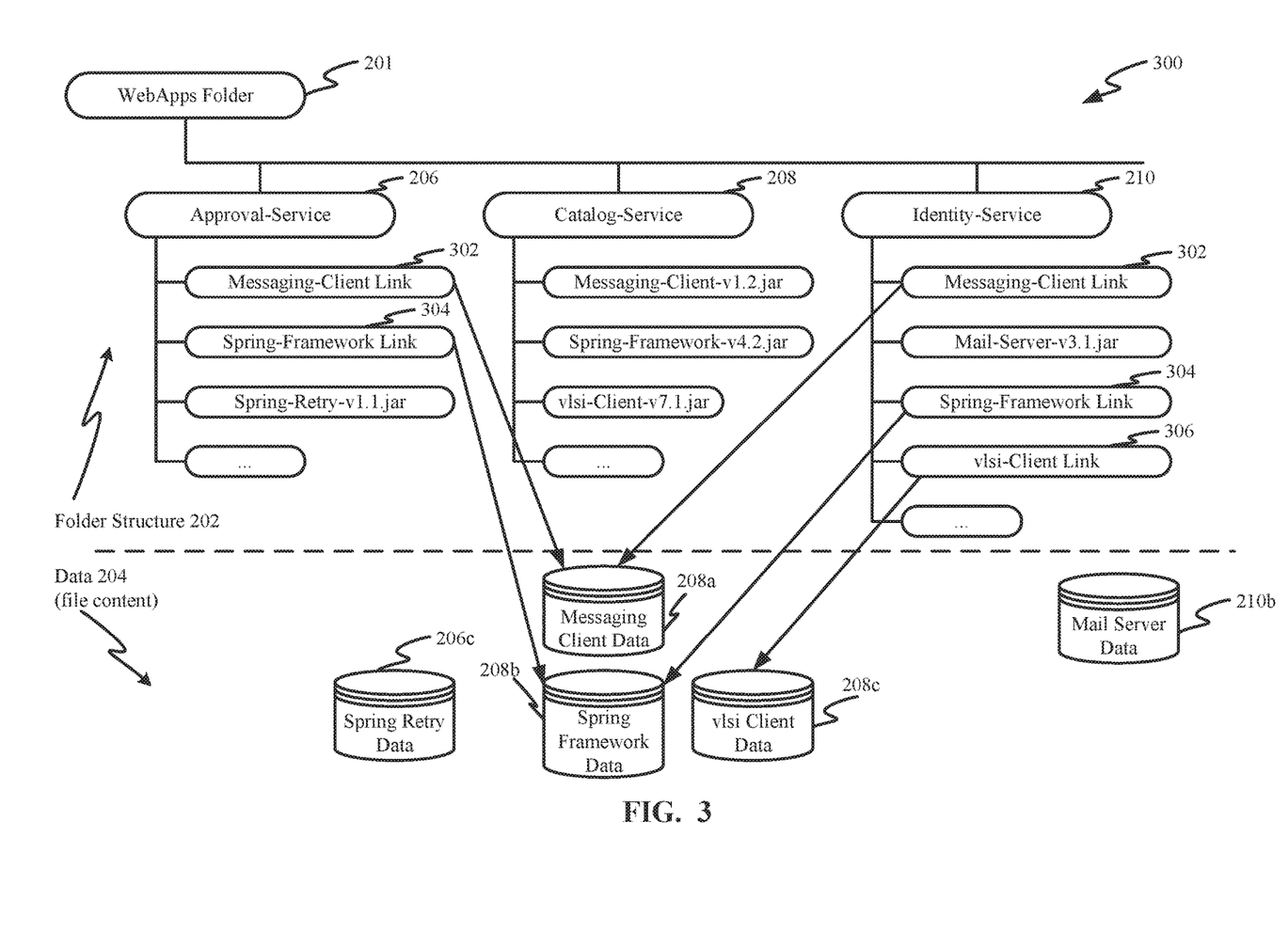
FIG. 3 illustrates another portion of an example build profile generated by the example package distributor of FIG. 1.

By using hard links to replace duplicate libraries, rather than symbolic links, the example duplicate remover 130 maintains the folder structure of the build profile 122. FIG. 3 illustrates a build optimized portion 300 of the example implementation of the build profile 122. In the illustrated example of FIG. 3, the build optimized portion 300 includes the example approval service WAR file 206 ("approval-service"), the example catalog service WAR file 208 ("catalog-service") and the example identity service WAR file 210 ("identity-service") of the build profile 122 of FIG. 2.

In the illustrated example of FIG. 3, the example duplicate remover 130 replaces filenames corresponding to duplicate libraries (e.g., identified by the example duplicate identifier 128) with hard links to a same library. For example, the duplicate remover 130 replaces the "Messaging-Client-v1.2.jar" files in the approval service WAR file 206 and the identity service WAR file 210 with a "Messaging-Client Link" 302 to the "Messaging Client Data" library 208*a* included in the catalog service WAR file 208. Similarly, the example duplicate remover 130 replaces the "Spring-Framework-v4.2.jar" files in the approval service WAR file 206 and the identity service WAR file 210 with a "Spring-Framework Link" 304 to the "Spring Framework Data" library 208a included in the catalog service WAR file 208. The example duplicate remover 130 also replaces the "vlsi-Client-v7.1.jar" file in the identity service WAR file 210 with a "vlsi-Client Link" 306 to the "vlsi Client Data" library 208c included in the catalog service WAR file 208.

The example duplicate remover 130 of FIG. 1 then removes the duplicate libraries from the respective WAR files. For example, the duplicate remover 130 removes the "Messaging Client Data" libraries 206a, 210a included in the approval service WAR file 206 and the identity service WAR file 210. In the illustrated example of FIG. 3, the example duplicate remover 130 also removes the "Spring Framework Data" libraries 206b, 210c included in the approval service WAR file 206 and the identity service WAR file 210, and the "vlsi Client Data" library 210d included in the identity service WAR file 210. Thus, libraries that have non-unique file sizes and that have matching checksum values are modified to include hard links that point to the same data (e.g., the shared libraries) without occupying additional disk space.

By removing the duplicate libraries, the example duplicate remover 130 reduces the size of the build profile 122. For example, in the illustrated example of FIG. 2 and FIG. 3, the example duplicate remover 130 reduces the number of libraries included in the build profile 122 by 50 percent (e.g., five libraries included in the build optimized portion 300 of FIG. 3 can be divided by ten libraries included in the build portion 200 of FIG. 2 (e.g., 5/10*100=50%)). In the illustrated example, the size of the optimized build 132 varies based on the storage sizes of the respective libraries. For example, while the number of libraries included in the optimized build 132. (e.g., five libraries) is 50% less than the number of libraries included in the build profile 122 (e.g., ten libraries), the storage size of the optimized build 132 may be less than, for example, 60% of the storage size of the build profile 122.

Furthermore, because hard links are used to replace duplicate file contents in the optimized build 132, the folder structure of the optimized build 132 is maintained. For example, while the build optimizer 130 removes the "Messaging Client Data" library 206a from the optimized build 132, when the corresponding distribution package 136 is deployed (e.g., at one of the deployment environments 112), installing the approval service 206 includes executing the example "Messaging-Client Link" 302, which loads an instance of the "Messaging Client Data" library 208a into the folder structure of the approval service 206. Thus, the approval service 206, once installed, is able to access, modify, etc. a local instance of the "Messaging Client Data" library. Moreover, because the instance of the "Messaging Client Data" library is included in the folder structure of the approval service 206, when the approval service 206 accesses, modifies, etc. data included in the "Messaging Client Data" library, instances of the "Messaging Client Data" library included in other services are unaffected.

In the illustrated example of FIG. 1, the example package distributor 106 includes the package builder 134 to create the distribution package 136 to distribute (e.g., to one of the example deployment environments 112). The example package builder 134 converts the optimized build 132 into a format for relatively easy distribution. For example, the package builder 134 may convert the optimized build 132 into an OVA ("open virtualization format archive") file, an RPM ("Red Hat package manager") file, a tar file, etc. In some examples, certain file formats may be preferred depending on whether the distribution package 136 is intended for a fresh install of the application or an update of the application. For example, when creating a distribution package 136 for a fresh install of the application 102, the example package builder 134 may convert the optimized build 132 into an OVA file. The example package builder 134 may convert the optimized build 132 into an RPM file when creating the distribution package 136 for an update (e.g., an upgrade, a restore, etc.) of the application 102.

While an example manner of implementing the example package distributor 106 of FIG. 1 is illustrated in FIG. 1, one or more of the elements, processes and/or devices illustrated in FIG. 1 may be combined, divided, re-arranged, omitted, eliminated and/or implemented in any other way. Further, the example build generator 120, the example build optimizer 126, the example archive extractor 126, the example duplicate identifier 128, the example duplicate remover 130, the example package builder 134 and/or, more generally, the example package distributor 106 of FIG. 1 can be implemented by hardware, software, firmware and/or any combination of hardware, software and/or firmware. Thus, for example, any of the example build generator 120, the example build optimizer 126, the example archive extractor 126, the example duplicate identifier 128, the example duplicate remover 130, the example package builder 134 and/or, more generally, the example package distributor 106 of FIG. 1 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example build generator 120, the example build optimizer 126, the example archive extractor 126, the example duplicate identifier 128, the example duplicate remover 130, the example package builder 134 and/or, more generally, the example package distributor 106 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example build generator 120, the example build optimizer 126, the example archive extractor 126, the example duplicate identifier 128, the example duplicate remover 130, the example package builder 134 and/or, more generally, the example package distributor 106 of FIG. 1 may include one or more elements, processes and/or devices in addition to, or instead of, those illustrated in FIG. 1, and/or may include more than one of any or all of the illustrated elements, processes and devices.

Figure 4:
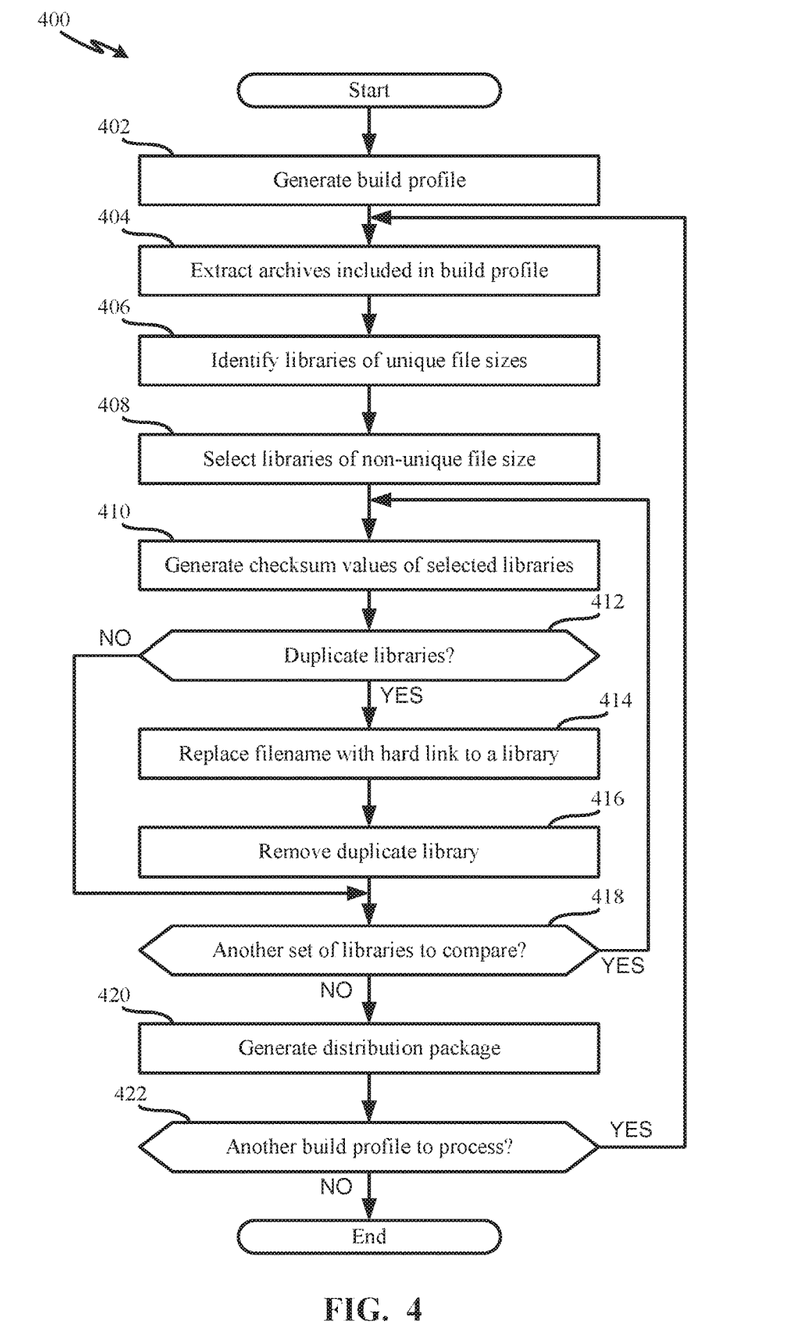
FIG. 4 is a flowchart representative of computer readable instructions that may be executed by the processing platform of FIG. 5 to implement the example package distributor of FIG. 1.

A flowchart representative of example machine readable instructions that may be executed to reduce application deployment sizes is shown in FIG. 4. In this example, the machine readable instructions implement programs for execution by a processor such as the processor 512 shown in the example processor platform 500 discussed below in connection with FIG. 5. The programs may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of reducing application deployment sizes in accordance with the teachings of this disclosure may alternatively be used. For example, the order of execution of the blocks may be changed, and/or some of the blocks described may be changed, eliminated, or combined.

As mentioned above, the example process of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 4 is a flowchart representative of example computer readable instructions 400 that may be executed by the example package distributor 106 to facilitate reducing application deployment sizes. The example program 400 of FIG. 4 begins at block 402 when the example package distributor 106 generates a build profile. For example, the example build generator 120 (FIG. 1) may generate the example build profile 122 based on items (e.g., templates) from the example catalog 130 and available application components (e.g., software services, scripts, code components, application-specific packages) that may be installed on provisioned virtual computing resources 114 in one of the deployment environments 112.

At block 404, the example build optimizer 124 (FIG. 1) extracts archive files included in the build profile 122. For example, the example archive extractor 126 (FIG. 1) parses the build profile 122 and identifies archives (e.g., web application archive (WAR) files) included in the build profile 122. The example archive extractor 126 also identifies application components included in the identified archives.

At block 406, the example duplicate identifier 128 (FIG. 1) compares file sizes of the libraries included in the extracted archives to identify unique libraries of unique file sizes. Libraries that are associated with unique file sizes (e.g., non-duplicated file sizes) are unique libraries that cannot be removed from the build profile 122. Libraries that are not identified as unique libraries by the duplicate identifier 128 at block 406 are candidates for qualifying as duplicate libraries.

At block 408, the example duplicate identifier 128 selects a set of libraries of a non-unique size (e.g., candidate libraries). For example, referring to the example build portion 200 of FIG. 2, the example duplicate identifier 128 may select the "Messaging Client Data" library 206a included in the approval service WAR file 206 and the "Messaging Client Data" library 208a included in the catalog service WAR file 208.

At block 410, the example build optimizer 124 generates checksum values of the selected libraries. For example, the duplicate identifier 128 (FIG. 1) may apply a checksum algorithm (e.g., a Secure Hash Algorithm 1 (SHA1), etc.) to the selected libraries to generate checksum values of the respective libraries. Example checksum algorithms that may be implemented by the duplicate identifier 128 include, for example, parity checks, modular sums, cyclic redundant checks, etc. However, other techniques for generating checksum values of the respective libraries may additionally or alternatively be used.

At block 412, the example duplicate identifier 128 determines whether the selected libraries are duplicate libraries. For example, the duplicate identifier 128 may compare the checksum values of the selected libraries (e.g., the "Messaging Client Data" library 206a and the "Messaging Client Data" library 208a) and determine the selected libraries are duplicate libraries when the checksum values match (e.g., are the same). If, at block 412, the example duplicate identifier 128 determines that the selected libraries are not duplicate libraries (e.g., the respective checksum values do not match), control proceeds to block 418 to determine if there is another set of libraries of a unique file size to compare.

If, at block 412, the example duplicate identifier 128 determines that the selected libraries are duplicate libraries (e.g., the respective checksum values match), then, at block 414, the example build optimizer 124 replaces the filename associated with one of the libraries with a hard link to the other library. For example, referring to the example optimized build 300 of FIG. 3, the example duplicate remover 130 (FIG. 1) replaces the "Messaging-Client-v1.2.jar" file in the approval service WAR file 206 with the "Messaging-Client Link" 302 to the "Messaging Client Data" library 208a included in the catalog service WAR file 208. In the illustrated example, the "Messaging-Client Link" 302 is a hard link to the "Messaging Client Data" library 208a.

At block 416, the example duplicate remover 130 removes the duplicate library from the respective WAR file. For example, referring to the example optimized build 300 of FIG. 3, the duplicate remover 130 removes the "Messaging Client Data" library 206a included in the approval service WAR file 206. At block 418, the example build optimizer 124 determines whether there is another set of libraries to compare. For example, the duplicate identifier 128 may check the file sizes of the remaining non-unique libraries included in the build profile 122 to determine if there are any unprocessed sets of libraries. If, at block 418, the example duplicate identifier 128 determines that there is another set of libraries to compare, control returns to block 410 to generate checksum values of the selected libraries.

If, at block 418, the example duplicate identifier 128 determines that there is not another set of libraries to compare, then, at block 420, the example package distributor 106 generates the distribution package 136 (e.g., for deployment to one of the deployment environments 112) For example, the package builder 134 (FIG. 1) may build an OVA file, an RPM file, a tar file, etc. based on the optimized build 132 provided by the build optimizer 124. In some examples, the package builder 134 selects the format of the distribution package 136 based on whether the distribution package 136 corresponds to a new install of the corresponding application 102, corresponds to an update of a previously installed application, etc.

At block 422, the example package distributor 106 determines whether there is another build profile to process. For example, the package distributor 106 may determine whether there is another build profile 122 for which deployment size reduction may be performed. If, at block 422, the package distributor 106 determines that there is another build profile 122 to optimize, control returns to block 404 to extract archives included in the build profile 122. If, at block 422, the example package distributor 106 determines that there is not another build profile 122 to optimize, the example program 400 of FIG. 4 ends.

Figure 5:
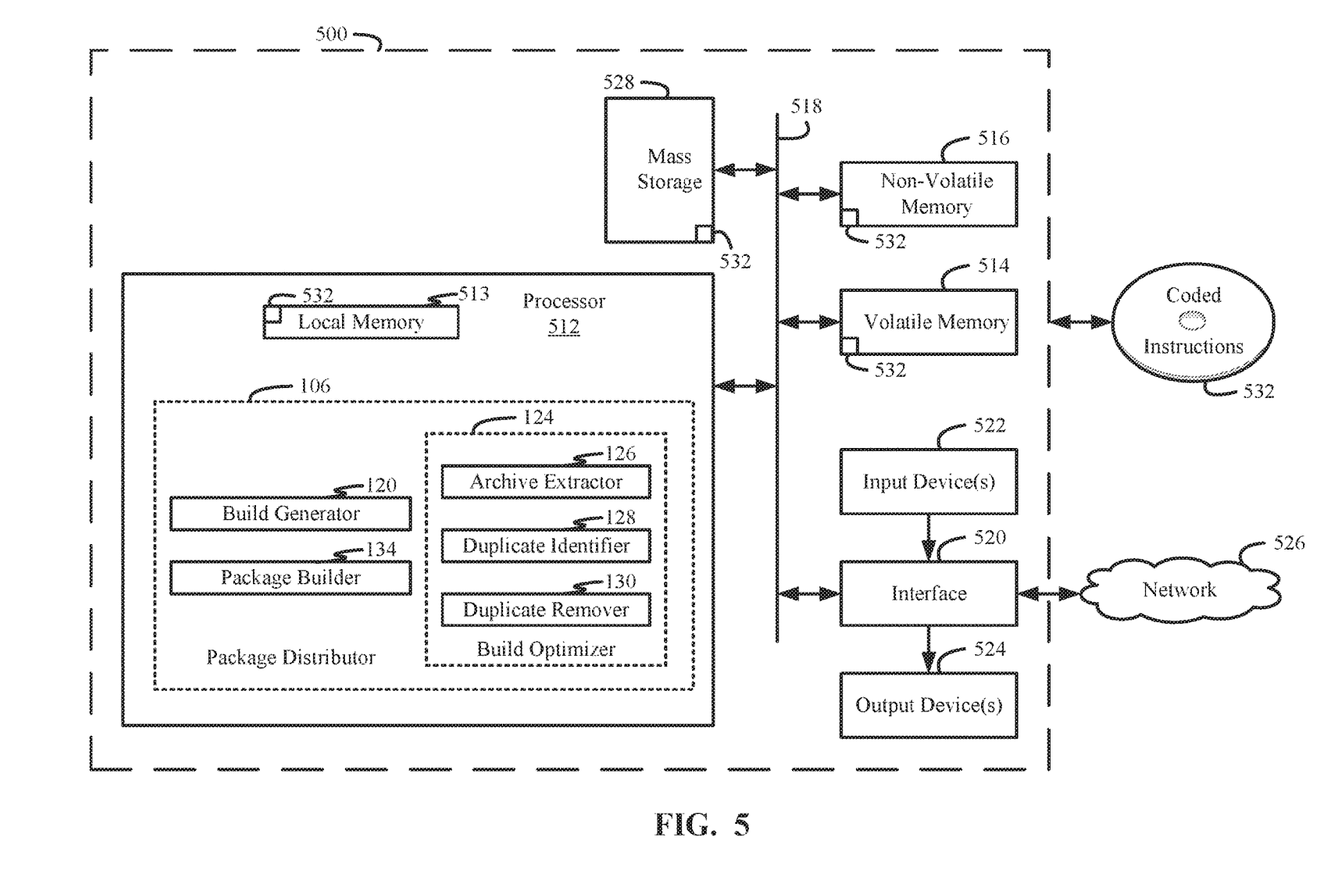
FIG. 5 is a block diagram of an example processing platform capable of executing the example machine-readable instructions of FIG. 4.

FIG. 5 is a block diagram of an example processor platform 500 capable of executing the instructions of FIG. 4 to implement the example systems, operation, and management of FIG. 1. The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer.

The processor 512 of the illustrated example includes a local memory 513 (e.g., a cache), and executes instructions to implement the example system 100 or portions thereof, such as the example packager distributor 106, the example build generator 120, the example build optimizer 124, the example archive extractor 126, the example duplicate identifier 128, the example duplicate remover 130 and/or the example package builder 134. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include flash devices, floppy disk drives, hard drive disks, optical compact disk (CD) drives, optical Blu-ray disk drives, RAID systems, and optical digital versatile disk (DVD) drives.

Coded instructions 532 representative of the example machine readable instructions of FIG. 4 may be stored in the mass storage device 528, in the volatile memory 514, in the non-volatile memory 1816, and/or on a removable tangible computer readable storage medium such as a CD or DVD.

In certain examples, the processor 512 can be used to implement the example packager distributor 106, the example build generator 120, the example build optimizer 124, the example archive extractor 126, the example duplicate identifier 128, the example duplicate remover 130 and/or the example package builder 134. In certain examples, as discussed herein, the hardware of processor 512 is virtualized using virtualization such as VMs and/or containers. In the example of FIG. 5, the package distributor 106 can be implemented by one or more VMs or containers, so as to virtualize the hardware of processor 512.

From the foregoing, it will be appreciated that the above disclosed methods, apparatus and articles of manufacture facilitate reducing application deployment sizes. Examples disclosed herein facilitate reducing application deployment sizes by identifying duplicate libraries during build time of the build profile corresponding to the application deployment. For example, disclosed examples include identifying duplicate libraries based on file sizes, names, checksum values, etc. in the build profile. Disclosed examples then replace the duplicate libraries with hard links to a first implementation of the library. By using hard links, the folder structure of the build profile is maintained. Disclosed examples then create the distribution package based on the updated build profile (e.g., without the duplicate libraries).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a computing device comprising a processor and memory;
 a build generator, executed by the computing device, to generate a build profile associated with a virtual appliance in a virtualization environment, the build profile including a plurality of application components including archive files associated with the virtual appliance, wherein the build profile occupies a first file size in the memory;

a duplicate identifier, executed by the computing device, to determine when a first library and a second library included in the build profile are duplicate libraries, the first library associated with a first filename and a first data portion and the second library associated with a second filename and a second data portion; and a duplicate remover, executed by the computing device, in response to a determination that the first library and the second library are duplicate libraries, to replace the first filename with a hard link to the second data portion to update the build profile, wherein the duplicate remover removes the first library from the build profile while maintaining a folder structure of the virtual appliance, and the update to the build profile occupies a second file size in the memory that is smaller than the first file size.

2. The apparatus of claim 1, wherein the duplicate identifier is to determine whether the first library and the second library are duplicate libraries by comparing a first library file size associated with the first library and a second library file size associated with the second library.

3. The apparatus of claim 2, wherein the duplicate identifier is to:

generate a first checksum value associated with the first library and generate a second checksum value associated with the second library when the first library file size and the second library file size are non-unique values; and compare the first checksum value with the second checksum value to determine whether the first library and second library are duplicate libraries.

4. The apparatus of claim 1, wherein the duplicate identifier is to determine whether the first library and the second library are duplicate libraries by comparing a first checksum value associated with the first library and a second checksum value associated with the second library.

5. The apparatus of claim 1, further including a package builder to generate a distribution package based on the updated build profile.

6. The apparatus of claim 5, wherein the distribution package is an open virtualization format archive file when the build profile is associated with a new install of the virtual appliance.

7. The apparatus of claim 5, wherein the distribution package is a Red Hat package manager file when the build profile is associated with an update of the virtual appliance.

8. A non-transitory computer readable storage medium comprising instructions that when executed, cause a machine to implement at least:

a build generator to generate a build profile associated with a virtual appliance in a virtualization environment, the build profile including a plurality of application components including archive files associated with the virtual appliance, wherein the build profile occupies a first file size in memory;

a duplicate identifier to determine when a first library and a second library included in the build profile are duplicate libraries, the first library associated with a first filename and a first data portion and the second library associated with a second filename and a second data portion; and a duplicate remover to, in response to a determination that the first library and the second library are duplicate libraries, replace the first filename with a hard link to the second data portion to update the build profile, wherein the duplicate remover removes the first library from the build profile while maintaining a folder structure of the virtual appliance, and the update to the build profile occupies a second file size in the memory that is smaller than the first file size.

9. The non-transitory computer readable storage medium of claim 8, wherein the instructions, when executed, cause the duplicate identifier to determine whether the first library and the second library are duplicate libraries by comparing a first library file size associated with the first library and a second library file size associated with the second library.

10. The non-transitory computer readable storage medium of claim 9, wherein the duplicate identifier is to:

generate a first checksum value associated with the first library and generate a second checksum value associated with the second library when the first library file size and the second library file size are non-unique values; and compare the first checksum value with the second checksum value to determine whether the first library and second library are duplicate libraries.

11. The non-transitory computer readable storage medium of claim 8, wherein the instructions, when executed, cause the duplicate identifier to determine whether the first library and the second library are duplicate libraries by comparing a first checksum value associated with the first library and a second checksum value associated with the second library.

12. The non-transitory computer readable storage medium of claim 8, wherein the instructions, when executed, further cause the machine to implement a package builder to generate a distribution package based on the updated build profile.

13. A method comprising:

generating, by executing an instruction with at least one processor, a build profile associated with a virtual appliance in a virtualization environment, the build profile including a plurality of application components including archive files associated with the virtual appliance, wherein the build profile occupies a first file size in memory;

determining, by executing an instruction with the at least one processor, when a first library and a second library included in the build profile are duplicate libraries, the first library associated with a first filename and a first data portion and the second library associated with a second filename and a second data portion;

in response to determining that the first library and the second library are duplicate libraries, replacing, by executing an instruction with the at least one processor, the first filename with a hard link to the second data portion to update the build profile; and removing, by executing an instruction with the at least one processor, the first library from the build profile while maintaining a folder structure of the virtual appliance, wherein removing the first data portion causes the build profile to occupy a second file in the memory that is smaller than the first file size.

14. The method of claim 13, wherein determining when the first library and the second library are duplicate libraries includes comparing a first library file size associated with the first library and a second library file size associated with the second library.

15. The method of claim 14, further including:

generating a first checksum value associated with the first library and generating a second checksum value associated with the second library when the first library file size and the second library file size are non-unique values; and comparing the first checksum value with the second checksum value to determine whether the first library and second library are duplicate libraries.

16. The method of claim 13, wherein determining when the first library and the second library are duplicate libraries includes comparing a first checksum value associated with the first library and a second checksum value associated with the second library.

17. The method of claim 13, further including extracting the archive files included in the build profile.

18. The method of claim 13, further comprising, in response to removing the first library from the build profile, generating a distribution package based on the build profile.

19. The method of claim 18, wherein the distribution package is an open virtualization format archive file when the build profile is associated with a new install of the virtual appliance.

20. The method of claim 18, wherein the distribution package is a Red Hat package manager file when the build profile is associated with an update of the virtual appliance.

\* \* \* \* \*